March 6, 1962 F. W. ROBERTS ET AL 3,024,319
SINGLE OR REPETITIVE REPRODUCTION OF SOUND
SIGNALS ON A LOOP-SHAPED RECORD
Filed March 25, 1958 6 Sheets-Sheet 1

INVENTORS.
Frederick W. Roberts
John R. Montgomery
Frederick W. Schueler
BY
Curtis Morris + Safford
ATTORNEYS March 6, 1962 F. W. ROBERTS ET AL 3,024,319
SINGLE OR REPETITIVE REPRODUCTION OF SOUND
SIGNALS ON A LOOP-SHAPED RECORD
Filed March 25, 1958 6 Sheets-Sheet 4

INVENTORS
Frederick W. Roberts
John R. Montgomery
Frederick W. Schueler
BY
Curtis, Morris + Safford
ATTORNEYS

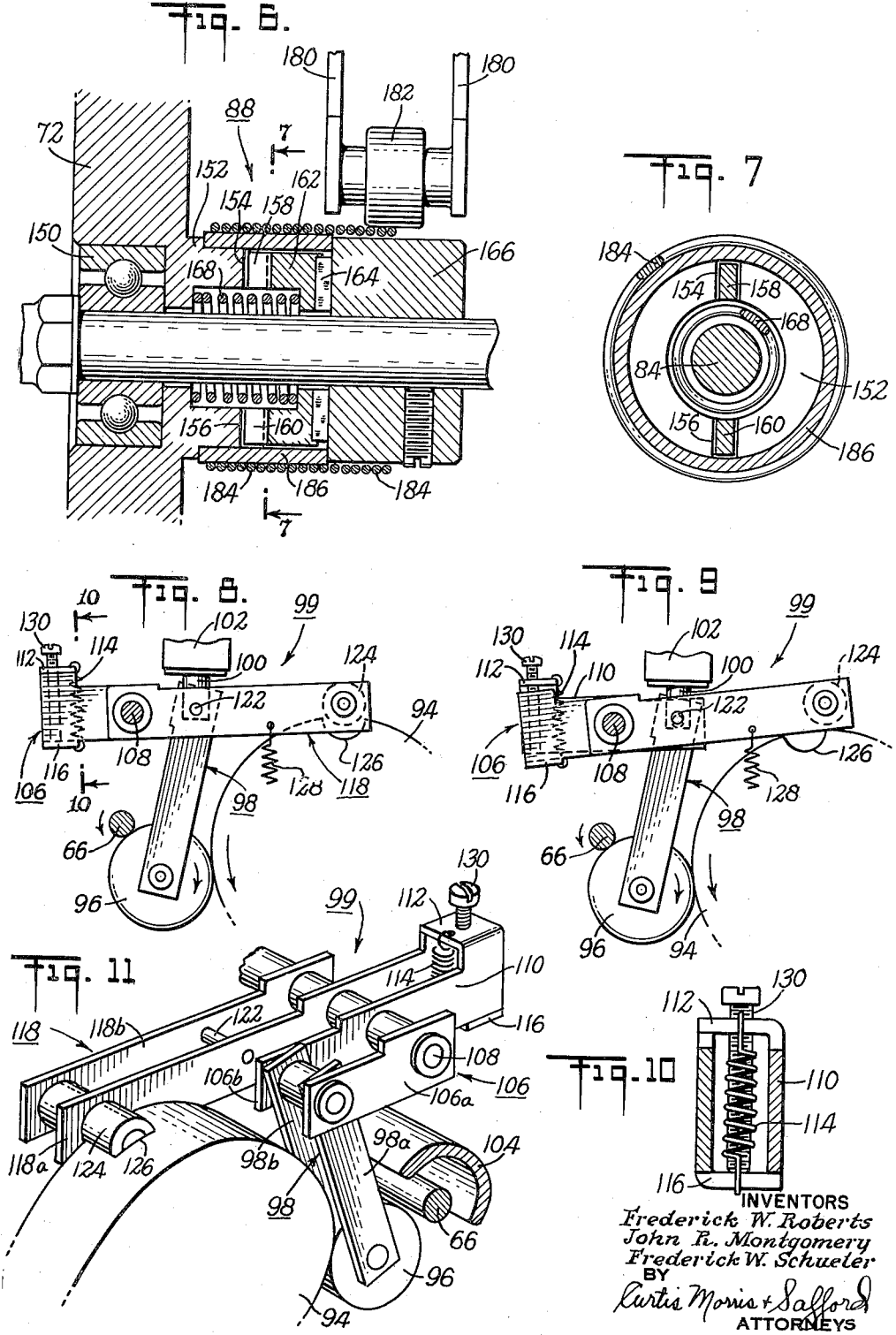

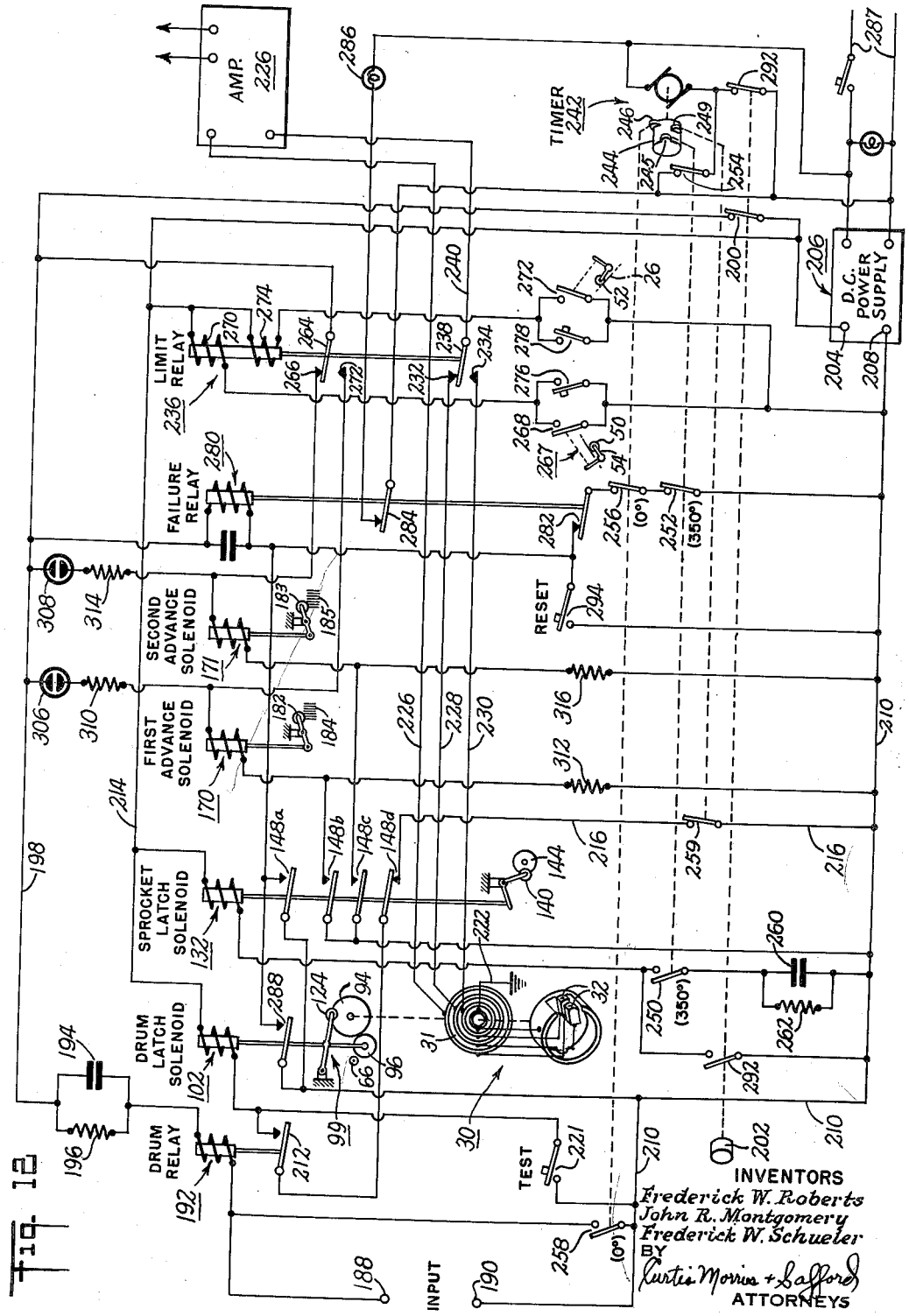

United States Patent Office 3,024,319
Patented Mar. 6, 1962

3,024,319
SINGLE OR REPETITIVE REPRODUCTION OF SOUND SIGNALS ON A LOOP-SHAPED RECORD
Frederick W. Roberts, Fairfield, John R. Montgomery, Bridgeport, and Frederick W. Schueler, Stephney Depot, Monroe, Conn., assignors to Dictaphone Corporation, Bridgeport, Conn., a corporation of New York
Filed Mar. 25, 1958, Ser. No. 723,731
39 Claims. (Cl. 179—100.2)

This invention relates to sound signal systems activatable upon command, as from a remote point, and adapted when so activated to develop and transmit electrical signals corresponding to impressions on a movable record. More particularly, this invention relates to such a system comprising apparatus adapted to produce a single or repetitive reproduction of sound signals stored semi-permanently on a rotatably-mounted loop-shaped record, and wherein fresh sound signals are introduced into said record loop, e.g. in accordance with a preset timed program. Apparatus constructed in accordance with the present invention is especially adapted for use with remote dictation systems as disclosed in U.S. Patents 2,803,707 and 2,820,852 and application Serial No. 649,066, filed March 28, 1957, by Lloyd R. Jones et al.

One important application of the present invention is in making announcements of time. For example, in many industrial manufacturing plants it is desirable for accounting or wage incentive reasons to have the production workers make an exact and permanent record of the times when job assignments were started and completed. For this purpose, it has been found advantageous to employ a remote dictation system, such as described in the above-mentioned application, usable by any one of a number of workers for dictating, to a centrally located recording machine, detailed information such as the job number and the times when the job was started and completed. As an aid to such a procedure, the present invention provides apparatus that is automatically operable, when the worker first lifts up the telephone handset of the remote dictation system, to produce a voice signal stating the time at that moment. This spoken time announcement is transmitted to the central recording machine to be recorded thereby immediately prior to recording of the dictated message concerning the details of the production job.

In accordance with one embodiment of the present invention, as described hereinbelow in more detail, time announcements are produced by a magnetic tape machine comprising a pair of rotatable reels on which the magnetic tape is wound for movement therebetween. Intermediate these reels is a rotatable drum about which the tape is wrapped in the form of a semi-circular loop in contact with the outer periphery of the drum. This drum carries a reproducing head which, when the drum is rotated one full revolution, scans all of the sound signal impressions on the loop of tape wrapped around the drum.

The magnetic tape is pre-recorded with sequential time-announcements in the form of spoken words, e.g. "four-thirty-one," "four-thirty-two," etc., with each time announcement occupying a segment of tape just long enough to form the semi-circular loop in contact with the rotatable drum. The tape is normally stationary to accommodate scanning by the reproducing head on the drum. However, the tape is automatically advanced at appropriate periodic intervals, such as once every minute, by a programming mechanism arranged to shift the tape past the drum in incremental steps equal to the length of each segment, so as to obtain correspondence between the announced time and actual time.

In operation, whenever the time-announcing apparatus is "interrogated," e.g. by the activation of a remote dictation system as described above, the rotatable drum is caused to revolve one full revolution. The reproducing head carried by this drum accordingly scans the spoken announcement (such as "four-thirty-one") on the segment of tape then disposed about the drum, and produces a corresponding electrical signal which is fed to the central recording machine of the dictation system. When it is time for the next sequential segment of tape to be moved into position, a drive motor is coupled momentarily to one of the tape reels so as to pull the tape around the rotatable drum which at this time is stationary. Thus there is moved into position, for subsequent scanning by the reproducing head, a new segment of the tape having recorded thereon an announcement of the next increment of time, e.g. "four-thirty-two." The amount of tape drawn through during each advancing movement is controlled by a metering arrangement which assures the maintenance of precise synchronism between the time announcements and actual time.

It will be apparent that apparatus constructed in accordance with the present invention is useful in a number of applications, i.e. wherever it is desired to store sequential sound information signals for subsequent single or repetitive playback. For that reason, it is desired to emphasize that the present invention in its broadest aspects is not limited to the specific apparatus disclosed herein, since variations in the form and usage of this apparatus will be apparent to those skilled in the art.

Accordingly, it is an object of this invention to provide apparatus of the type described that is superior to such apparatus provided heretofore. It is a further object of this invention to provide apparatus adapted to produce remote reproduction of sound information signals sequentially recorded on a movable record medium. It is a still further object of this invention to provide such apparatus that is simple in construction and inexpensive to manufacture. Other objects, advantages and aspects of the present invention will be in part apparent from, and in part pointed out in, the following description considered together with the accompanying drawings, in which:

FIGURE 6 is a cross-section taken along lines 6—6 of FIGURE 4, showing details of one of the reel drive clutches;

FIGURE 7 is a section taken along lines 7—7 of FIGURE 6;

FIGURES 8 and 9 show the drum drive linkage in two different operational positions;

FIGURE 10 is a detail section taken along lines 10—10 of FIGURE 8;

FIGURE 11 is a perspective view showing details of the drum drive linkage; and

FIGURE 12 is a schematic diagram showing the control circuits.

Figure 1:
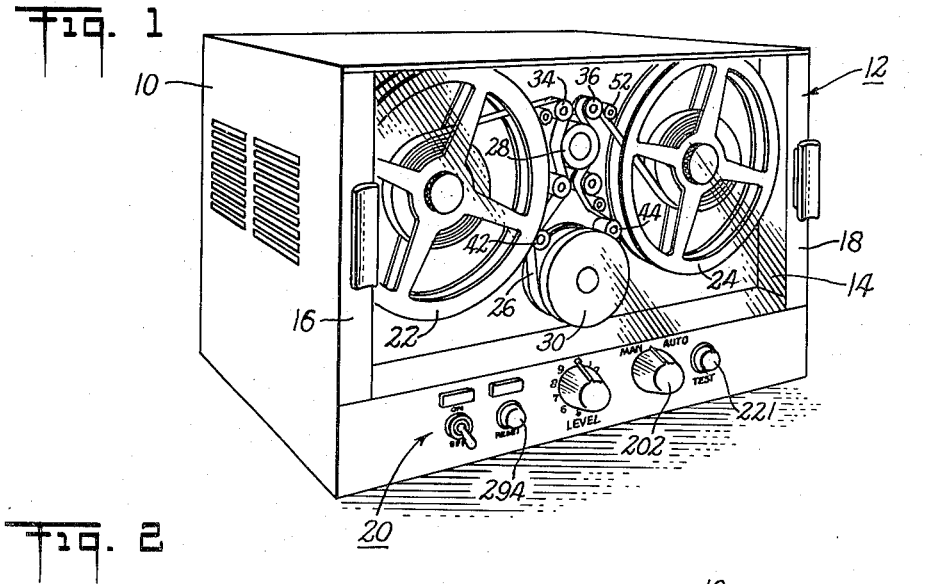
FIGURE 1 is a perspective view of time-announcing apparatus constructed in accordance with the present invention.
Figure 2:
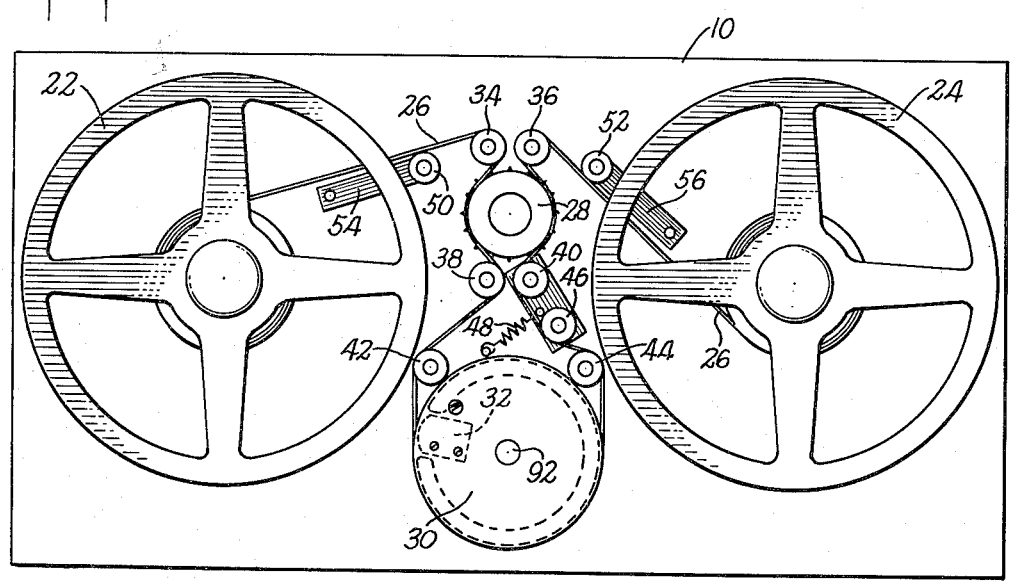
FIGURE 2 is a front elevation of the tape reels and associated elements shown in FIGURE 1.

Referring now to FIGURES 1 and 2, the time-announcing apparatus in accordance with the present invention comprises a housing 10 having a removable front door 12 consisting of a transparent sheet 14 supported at its side edges by two handle members 16 and 18. Immediately below the door are a series of operating controls, generally indicated at 20, which will be described in more detail hereinbelow. Behind the transparent sheet 14 are mounted a pair of rotatable reels 22 and 24 carrying a strip of double-perforated magnetic tape 26 having a width of 16 mm.

Intermediate the two reels 22, 24, the tape 26 engages both sides of a metering sprocket 28 formed on its periphery with two rows of teeth corresponding to the perforations in the edges of the tape. From the metering sprocket, the tape passes around a rotatable drum 30 carrying a pair of magnetic heads 32 mounted side-by-side and adapted, when the drum is revolved, to scan corresponding dual sound tracks on that portion of the magnetic tape in contact with the drum. The tape also is wound around a series of idler rollers 34, 36, 38, 40, 42 and 44, and is held taut about the drum by a swingably-mounted roller 46 which is urged by a spring 48 into pressure contact with the tape.

The two parallel sound tracks of the magnetic tape 26 consist of a pre-recorded consecutive series of spoken time announcements each occupying a segment just long enough to extend around the lower half of the drum 30. The time announcements on one track may, for example, run from 12 midnight to 12 noon, with announcements for every minute of the time, while the other sound track may similarly be pre-recorded to run from 12 noon to 12 midnight. During the first twelve hours of the day, the tape will be advanced once every minute in one direction to bring the successive segments into contact with the drum, and during the second twelve hours the tape will similarly be advanced in the other direction. Only one of the two magnetic heads 32 is activated at a time, so that the signals on only one of the two sound tracks will be reproduced in accordance with the direction of advancing movement of the tape. In the stationary position of the drum, both heads are out of contact with the tape to assure that no sound signals are produced while the tape is being advanced.

Between the times of advancing movement of the tape, the pre-recorded tape segment wrapped around the lower half of the drum 30 may be "read-out" by rotating the drum one full revolution so as to cause the magnetic heads 32 to scan this tape segment. The rotation of the drum 30 is controlled by a drum drive mechanism, to be described, that may for example be activated by a remote dictation system, e.g. whenever the handset of one of the remote dictating stations is lifted out of its cradle. In such an arrangement, the time announcement signal normally will be fed to the central recording machine of the remote dictation system so as to make a recording of the time that the message was dictated.

The time announcements recorded on the magnetic tape 26 can, of course, be divided into any desired fraction of time, e.g. every minute, every half-minute, etc. In the apparatus disclosed herein, the time announcements are recorded on an every-minute basis and, consequently, it is necessary to advance the tape around the drum once every minute. The operation of this advancing mechanism, which will be described hereinbelow in more detail, is controlled by the metering sprocket 28 so as to assure that each segment is precisely positioned about the lower half of the drum. For this purpose, the metering sprocket has a circumference exactly equal to the length of each time announcement segment (4.8"), and is controlled by an indexing mechanism in such a way that the sprocket will rotate exactly one full revolution during each advancing movement of the tape. Since the metering sprocket is effectively keyed to the tape at both ends of the loop passing around the drum, one revolution of this sprocket will meter the tape a distance that is precisely equal to the length of one of the time-announcement segments.

To automatically reverse the direction of tape movement when either of the reels 22 or 24 has been exhausted, there is provided adjacent the tape 26 a pair of sensing rollers 50 and 52 secured to corresponding pivot arms 54 and 56. The ends of the tape are securely fastened to the spindles of the reels so that, when one of the reels becomes exhausted, the tape will swing in a wide arc about the corresponding idler roller 34 or 36, and carry with it a corresponding one of the sensing rollers 50 or 52. The resultant movement of the pivot arms 54 or 56 operates respective switches (not shown in this figure) which automatically reverse the direction of tape movement, as will be described subsequently.

Figure 3:
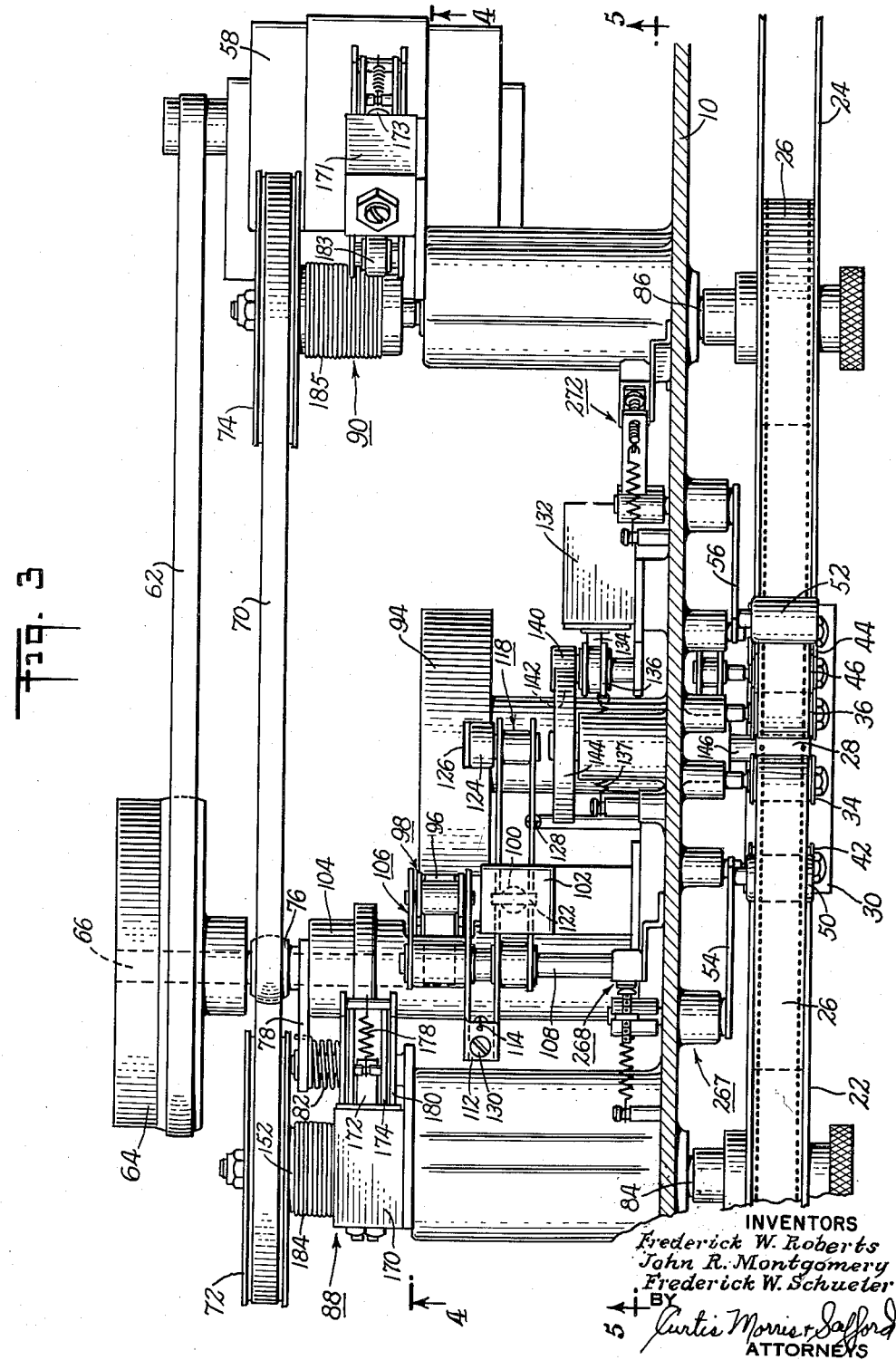
FIGURE 3 is a plan view of the apparatus of FIGURE 1, shown with the top cover removed.
Figure 4:
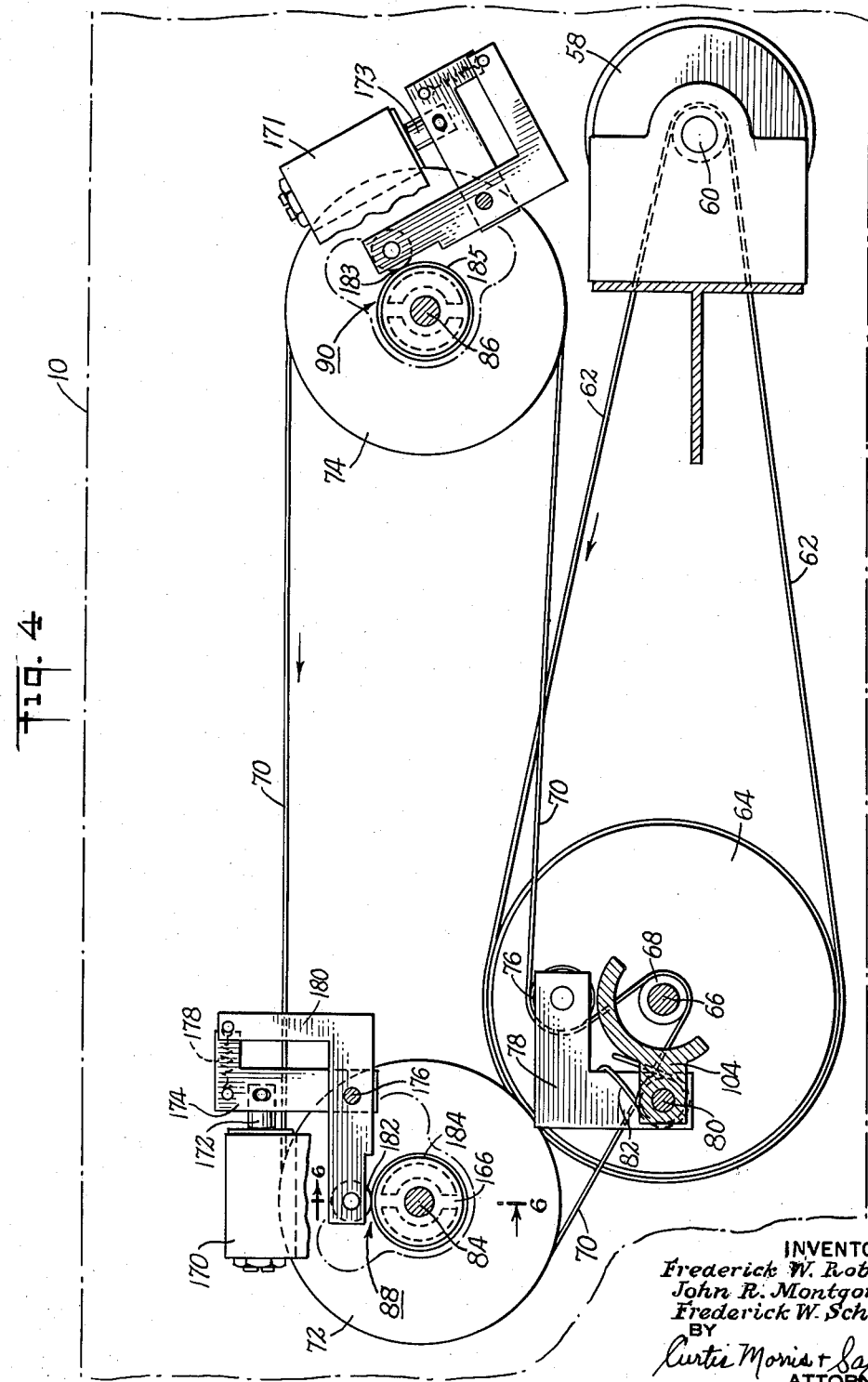
FIGURE 4 is a vertical section taken along lines 4—4 of FIGURE 3.

Referring now to FIGURE 3, which is a plan view of the time announcing apparatus with the top cover removed, there is shown in the upper right-hand corner a motor 58 which provides power both for rotating the drum 30 and for advancing the tape 26 around this drum in accordance with the control function established. Referring now also to the lower right-hand corner of FIGURE 4, the shaft 60 of this motor drives an endless belt 62 which at its other end is wrapped around a large crowned pulley 64 mounted on a pulley shaft 66. The drum drive mechanism to be described is adapted to be coupled to this pulley shaft 66 so as to rotate the drum and scan the tape segment then positioned about the drum. This pulley shaft 66 also carries a smaller pulley 68 driving a second endless belt 70 which, in turn, continuously rotates a pair of spindle pulleys 72 and 74. The belt 70 is tensioned by an idler wheel 76 pivotally mounted on an L-shaped bracket 78 which is urged in a counter-clockwise direction about its pivot 80 by means of a spring 82. The spindle pulleys 72, 74 are mounted on respective shafts 84, 86, and provided with corresponding clutch mechanisms, generally indicated at 88 and 90, to couple these pulleys to the respective reels 22, 24.

*Drum Drive Mechanism*

Figure 5:
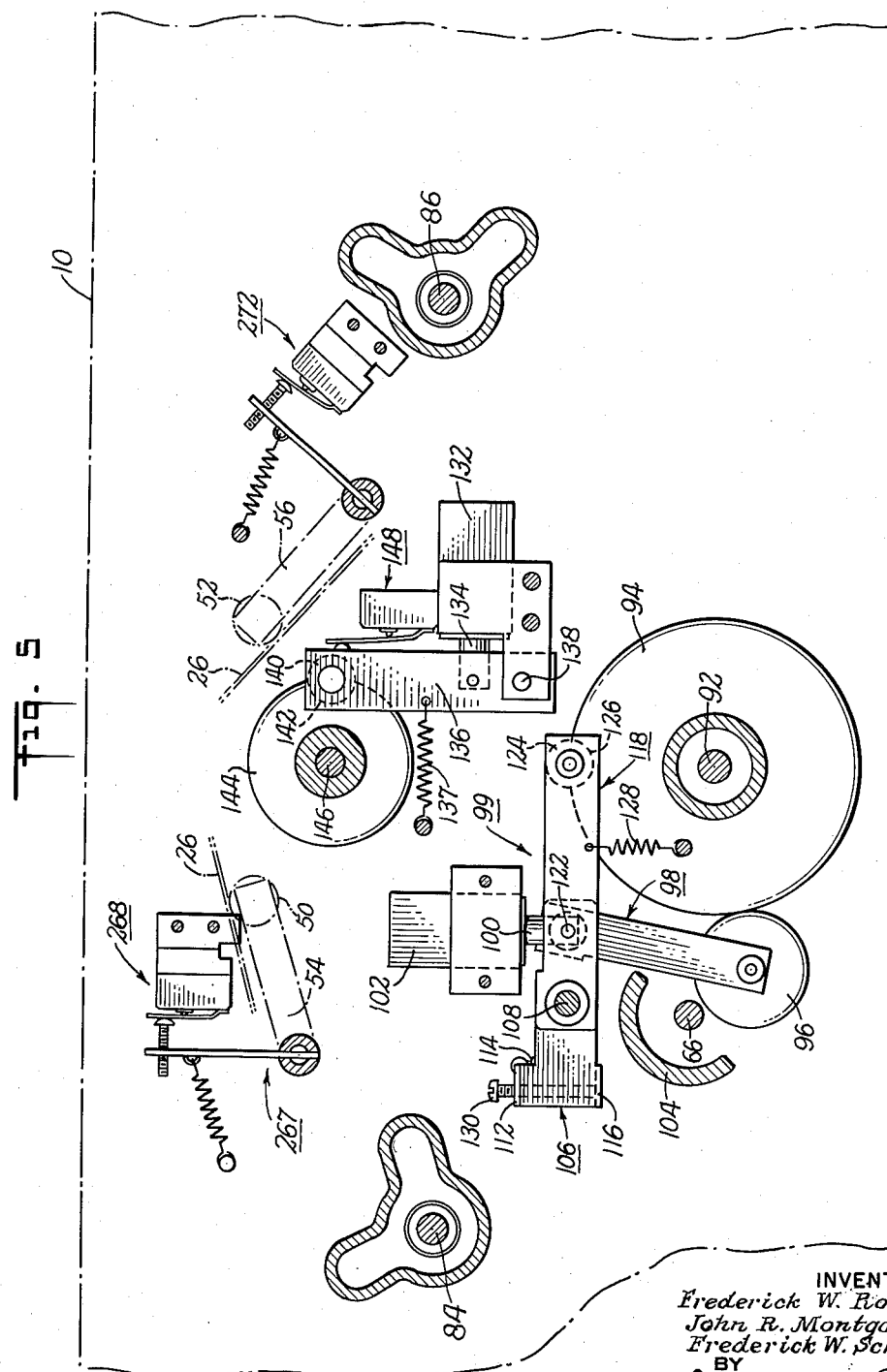
FIGURE 5 is a vertical section taken along lines 5—5 of FIGURE 3.

Referring now to FIGURES 2, 3 and 5, the magnetic drum 30 is mounted on a shaft 92 which extends through the front wall of the housing 10 and carries on its inner end a drive wheel 94. As shown particularly in FIGURE 5, the periphery of this drive wheel is engaged by a resilient puck 96 rotatably mounted on the lower end of a puck arm 98. The upper end of this arm is coupled, by means of a drum drive linkage generally indicated at 99, to the armature 100 of a drum latch solenoid 102. This solenoid is energized whenever the time announcing apparatus is interrogated, e.g. by a remote dictation system, and serves to lift the puck 96 upwards into contact with the pulley shaft 66 so as to transmit rotary motion to the wheel 94 and thence to the drum 30. The pulley shaft is surrounded by a boss 104 which is cut away adjacent the puck 96 to form an aperture permitting engagement between the puck and the shaft.

As may be seen in FIGURE 11, the puck arm 98 consists of two parallel members 98a, 98b extending down on either side of the puck 96 and pivotally pinned at their upper ends to a generally horizontal lever arm also consisting of a pair of parallel members 106a, 106b. This lever arm 106 is rotatably mounted on a shaft 108, and includes a rearward extension 110 provided at its remote end with a generally L-shaped tab 112 (see also FIGURE 10). This tab is coupled by means of a spring 114 to a cooperating tab 116 forming the end of a linkage arm 118 consisting of a pair of parallel members 118a, 118b. This linkage arm is rotatably mounted by the shaft 108, and carries a pin 122 which is pivotally secured to the lower end of the solenoid armature 100. Thus, when the armature is lifted vertically, the linkage arm 118 rotates about its pivot shaft 108 and, through the coupling spring 114, rotates the lever arm 106 about the same shaft 108 so as to pull the puck 96 up into engagement with the pulley shaft 66.

The linkage arm 118 carries at its other end a rotatably-mounted latch roller 124 which, as shown in FIGURE 5, normally rests in a semi-circular top dwell 126 cut in the periphery of the drum drive wheel 94. When the linkage arm 118 is lifted upwards by the solenoid armature 100, this roller 124 (see FIGURE 8) moves out of the dwell to permit the drive wheel to be rotated by the puck 96.

As may be seen in FIGURE 9, the upward movement of the solenoid armature 100 causes the lever arm 106 to rotate only a distance sufficient to produce engagement between the puck 96 and the pulley shaft 66, the continued upward movement of the armature serving merely to expand the coupling spring 114 and to further rotate the linkage arm 118 carrying the detent roller 124. Thus, the puck is held in place by the resilient force of the coupling spring so that it is unnecessary to precisely fix the upper limit of the solenoid stroke. A bolt 130 is screwed into the lever arm tab 112 with its lower end engageable with the other tab 116 to permit an adjustment of the zero setting between the lever arm 106 and the linkage arm 118, so as to assure that the puck is in driving engagement with the pulley shaft when the roller 124 has been lifted clear of its dwell.

After the drive wheel has been rotated a short distance, the solenoid is de-energized, and the roller 124 rides on the periphery of the drive wheel 94 so as to maintain the puck 96 in engagement with the pulley shaft 66. At the end of one full revolution, the roller 124 falls back into the dwell 126 and thereby disengages the puck from the pulley shaft 66. The roller 124 is pulled down into the dwell by the action of a spring 128 which is secured to the linkage arm 118.

*Tape Advancing Mechanism*

The periodic advancing movement of the tape 26 around the drum 30 is initiated by momentarily energizing a sprocket latch solenoid, generally indicated at 132 in the center of FIGURE 5. The armature 134 of this solenoid thereupon moves to the right and rotates a sprocket locking arm 136 about its pivot pin 138. The upper end of this arm carries a latch roller 140 which normally rests in a side dwell 142 formed in the periphery of a sprocket latch wheel 144. This sprocket wheel is mounted on a shaft 146 which at its other end carries the metering sprocket 28 (FIGURE 2).

When the locking arm 136 lifts the latch roller 140 from the side dwell 142, the metering sprocket 28 is free to be rotated by the advancing movement of the magnetic tape 26 which is pulled by one of the reels 22 or 24. The locking arm 136 also operates a switch generally indicated at 148 which, through circuitry to be described, energizes one of the two drive clutches 88 or 90 to cause rotation of the corresponding reel. Since both of these clutches are effectively identical, only the left-hand clutch 88 will be described in detail.

Referring now to FIGURE 6, the spindle pulley 72 is mounted on the shaft 84 by ball bearings 150 to permit the pulley to be rotated continuously by the belt 70. During the periods between advancing movement of the tape, the drive clutch 88 is arranged to lightly couple the pulley 72 to the corresponding reel 22 so as to maintain a slight tension on the tape. The mechanism for accomplishing this will now be described.

The pulley 72 is formed with a projecting hub 152 which (see FIGURE 7) is formed at its end with two diametrically opposing slots 154, 156 adapted to receive a corresponding pair of drive tongues 158, 160 forming part of a cylindrical coupling member 162. This coupling member, which is continuously rotated along with the spindle pulley 72, carries on its right-hand end (FIGURE 6) a cork clutch disc 164 the outer face of which frictionally engages a cylindrical drive hub 166 securely fastened to the shaft 84. The clutch disc 164 is pressed lightly against the drive hub 166 by an interior coiled spring 168 which bears against both the coupling member 162 and the pulley hub 152.

Thus, the continuous rotation of the pulley 72 applies through the cork disc 164 a steady but light torque to the pulley shaft 84 which, through the reel 22, serves to tension the magnetic tape 26. Similarly, the other spindle pulley 74, operating through the clutch mechanism 90, produces a continuous light tensioning force tending to pull the magnetic tape 26 in the other direction. Normally, of course, the magnetic tape will not move because the metering sprocket 28 (FIGURE 2) is held fixed in position by means of the sprocket wheel 144 (FIGURE 5) and the latch roller 140 as described.

Returning now to the means for advancing the tape, when the sprocket latch switch 148 is actuated by the locking arm 136, an energizing signal is fed to one of two advance solenoids 170, 171 (see FIGURE 4) arranged respectively to actuate the clutches 88, 90 for positive driving action, as distinguished from the light tensioning action just described. Which solenoid is energized is determined by the conditioning of certain control circuits (to be described) in accordance with the direction the magnetic tape is to be advanced. Assuming, for purposes of discussion, that the tape is to be moved from the right-hand reel 24 to the left-hand reel 22, then the left-hand solenoid 170 will be energized. The armature 172 of this solenoid thereupon moves to the left and carries with it an L-shaped intermediate link 174 the lower end of which is pivoted about a pin 176. The link 174 is fastened by a spring 178 to a bell-crank 180 also pivoted about the pin 176. The horizontal arm of the bell-crank carries a rotatably mounted metal clutch roller 182 (see also FIGURE 6) which is arranged to press lightly against a closely-wound helical drive spring 184 when the advance solenoid 170 is energized.

The left-hand end (referring to FIGURE 6) of the drive spring 184 is wrapped tightly about a cylindrical extension 186 of the pulley hub 152 so that this spring rotates with the pulley 72. The right-hand end of the spring extends out over the cylindrical drive hub 166 but is normally out of contact with the drive hub because the hub diameter is slightly less than the diameter of the cylindrical extension 186. However, when the clutch roller 182 presses lightly down against the drive spring, it causes a frictional engagement between this spring and the drive hub so that the spring immediately wraps tightly about the drive hub and firmly couples it to the extension 186. Accordingly, the pulley 72 applies direct driving power to the spindle shaft 84 so as to rotate the reel 22 (FIGURE 2) and pull the magnetic tape 26 around the drum 30. The amount of tape moved by the drum during this operation is controlled by the metering sprocket 28 which, when it has rotated one full revolution, stops because the latch roller 140 (see FIGURE 5) is forced back into the dwell 142 by a spring 137 secured to the locking arm 136 (the sprocket latch solenoid 132 having in the meantime been de-energized). Consequently, the locking arm deactuates the sprocket latch switch 148 so that the advance solenoid 170 is de-energized and, accordingly, the helical drive spring 184 is released from the drive hub 166 to stop the movement of the reel 22.

*Operation*

The overall operation of the time announcing apparatus is best explained with reference to FIGURE 12 which is a schematic diagram of the control circuitry. In the left-hand edge of this diagram, there is shown a pair of input terminals 188, 190 which are connectible through a transmission line to the control equipment (not shown) of a remote dictation system. As explained above, the time announcing apparatus normally is interrogated each time one of the remote dictators activates the system to dictate a message to the central recording machine. To this end, the remote dictation control equipment is arranged (by conventional means, not shown) to close a switch whenever the system is activated, and this switch is arranged to short the two input terminals 188, 190 together.

Shorting the input terminals 188, 190 momentarily energizes a drum relay generally indicated at 192. The energizing circuit for this relay may be traced from the top of the relay winding through a condenser 194 (which is bridged by a bleeder resistor 196), along a power lead 198, through contacts 200 of a "manual-automatic" switch 202 to the positive terminal 204 of a D.-C. power supply generally indicated at 206; and from the negative terminal 208 of this power supply along a power lead 210, through the input terminals 190, 188, and back to the lower end of the relay winding. The relay is actuated by the charging current flowing into the condenser 194; when this condenser has been fully charged, the current flowing through the bleeder resistor 196 is insufficient to maintain the relay actuated, and accordingly it drops out after a momentary actuation. Normally the shorting switch at the remote dictation control equipment will stay closed only for a short time and, when it reopens, the condenser 194 will discharge through the bleeder resistor 196 so as to prepare the drum relay for subsequent re-energization.

Energization of the drum relay 192 closes its contacts 212 which complete an energizing circuit for the drum latch solenoid 102 (see also FIGURE 5). This energizing circuit may be traced from the upper end of the solenoid winding, through a power lead 214 to the positive terminal 204 of the D.-C. power supply 206; and from the negative terminal 208 of this power supply along lead 210, up a lead 216, through a switch 259, a set of contacts 148d of the sprocket latch solenoid 132 (see also FIGURE 5), and through contacts 212 back to the winding of the solenoid 102. Actuation of this solenoid 102, as discussed hereinabove, lifts the latch roller 124 out of its dwell in the drive wheel 94 and at the same time pulls the puck 96 into engagement with the pulley shaft 66 so as to cause the drive wheel to rotate one full revolution.

This drive wheel 94 carries with it the drum 30, the magnetic heads 32 of which scan the time announcement on the segment of tape wrapped about the lower half of the drum. The drum 30 also can be rotated to scan the magnetic tape 26 by closing a test switch 221 (also shown in FIGURE 1) which by-passes the drum relay contacts 212 and supplies energizing current directly to the drum latch solenoid 102.

As diagrammatically indicated in FIGURE 12, the drum 30 carries on its interior face a set of four slip rings 31 each engageable by one of four corresponding brushes. One of these slip rings serves, with a lead 222, to ground the drum, and another one of the slip rings couples the common terminals of the two magnetic heads 32 through a lead 224 to the upper input terminal of an amplifier generally indicated at 226. The remaining two slip rings carry the output signals of the two magnetic heads respectively, and are connected by leads 228, 230 to a pair of transfer contacts 232, 234 of a limit relay generally indicated at 236.

This limit relay 236 is of the two-winding type wherein the armature position is determined by which of the two windings was last energized. The positioning of this armature, as will be explained, determines the direction of advancing movement of the tape. Consequently, this relay also is used to select which of the two magnetic heads 32 is activated to transmit sound signals from the tape. For this purpose, a movable arm 238 of the relay is adapted to engage one or the other of the transfer contacts 232, 234 and to transmit the sound signals from the corresponding one of the two magnetic pick-up heads 32 along a lead 240 to the lower input terminal of the amplifier 226. The output of this amplifier is fed through a transmission line to the central recording machine (not shown) of the remote dictation system.

The periodic advancing of the magnetic tape 26 around the drum 30 is controlled (see the lower right-hand corner of FIGURE 12) by a constant-speed timer motor generally indicated at 242. This timer motor 242 rotates a cam disc, diagrammatically indicated at 244, carrying three cam lobes 245, 246, 249. As indicated by broken line 247, cam lobe 245 operates timer switches 250, 252, 254 substantially simultaneously; as indicated by broken line 248, cam lobe 246 similarly operates another pair of timer switches 256, 258; and cam lobe 249 operates switch 259. The first cam lobe 245 becomes operative at the end of each timing cycle, and the timer switches associated with this lobe are designated "350°" switches, indicating that the cam disc has made very nearly one full revolution from its home position. The cam lobe 246 becomes operative at the start of each cycle, and the associated timer switches are designated as "0°" switches. The cam lobe 249 operates before lobe 245 a period slightly in excess of the time required to read out one time announcement.

At the 350° position of the cam disc 244, the timer switch 250 is closed to supply energizing current to the sprocket latch solenoid 132, the current being fed from power leads 210 and 214 through a condenser 260 in series with the switch 250. This condenser is provided with a parallel bleeder resistor 262 to provide a discharge path for the condenser during the time that the solenoid is deactuated.

Actuation of the solenoid 132, as described hereinabove, shifts the latch roller 140 out of the sprocket wheel 144 to permit this wheel to rotate as the magnetic tape is advanced around the metering sprocket 28, and past the drum 30. In addition, actuation of this solenoid 132 closes a series of switches 148a, 148b, 148c, and opens another switch 148d. Opening of this latter switch 148d breaks the energizing circuit for the drum latch solenoid 102, so as to prevent rotation of the drum 30 during the advancing movement of the tape.

Closure of the switch contacts 148b and 148c completes an energizing circuit to one of the two advance solenoids 170 or 171; which solenoid is energized depends upon the positioning of the limit relay 236 referred to above. The limit relay is shown conditioned to energize the second advance solenoid 171, the circuit being traced from power lead 198, through a movable arm 264 and transfer contact 266 of the relay, through the advance solenoid winding, through the sprocket latch solenoid contacts 148c and back to the negative power lead 210. Consequently, the solenoid 171 actuates the right-hand clutch 90 (FIGURE 4) by pulling the roller 183 against the drive spring 185 which operates, in a manner similar to spring 184 of clutch 88, to rotate the tape reel 24. This reel pulls the tape past the drum 30 until the latch roller 140 moves back into the dwell in the sprocket wheel 144 thus opening the contacts 148c to break the energizing circuit for the advance solenoid 171.

When the left reel 22 has been exhausted by this periodic rotation of the reel 24, the consequent swinging movement of the tape (as described hereinabove with reference to FIGURE 2) shifts the sensing roller 50 downwards. Referring to FIGURE 12, this sensing roller 50 is shown diagrammatically beneath the limit relay 236 and, as indicated at 267 (see also FIGURE 5), operates a switch 268 which completes an energizing circuit for the upper winding 270 of the limit relay. When this winding is energized, the armature of the limit relay moves down and repositions the movable arms 238 and 264.

Movable arm 264 thereupon makes contact with a second transfer contact 272 so that, whenever the sprocket latch solenoid contacts 148b are closed, energizing current is fed to the first advance solenoid 170 rather than to the second advance solenoid 171. This solenoid 170 thereupon moves the corresponding clutch roller 182 into contact with the drive spring 184 so as to cause the reel 22 to rotate counterclockwise and draw the tape 26 from the reel 24. When the timer motor 242 has gone through sufficient cycles to exhaust the tape from the reel 24, the right-hand sensing roller 52 is shifted upwards and closes the corresponding sensing switch 272. Thus, the lower limit relay winding 274 is energized and the relay armature is pulled back up into its original position with the movable arms 238 and 264 in contact with the transfer contacts 232 and 266 respectively (as shown). Two manually-operable switches 276, 278 are connected in parallel with the sensing switches 268, 272, respectively, so that the direction of the movement of the tape 26 can be reversed at will.

The time announcing apparatus also is provided with means to indicate whenever there has been a failure in any of its operating elements. For this purpose, there is provided a failure relay 280 which is normally energized through a circuit traced from the positive power lead 198 through the failure relay winding, through contacts 282, through the 0° and 350° timer switches 256 and 252 to the negative power lead 210. When the cam disc 244 reaches its 350° position (at which time the tape is advanced past the drum 30), the timer switch 252 is momentarily opened thereby breaking the normal energizing circuit for the failure relay 280. However, just before the timer switch 252 opens, the 350° timer switch 250 closes (as described hereinabove) to energize the sprocket latch solenoid 132. Accordingly, if there is no failure in the operation of the sprocket latch mechanism, the sprocket latch switch contacts 148a will close to provide an alternate energizing path for the failure relay 280.

If there had been a failure in the sprocket latch mechanism, the contacts 148a would remain open and the failure relay 280 would drop out. The resultant opening of the failure relay contacts 284 breaks the energizing circuit for a failure lamp 286 which normally is provided with power from the A.-C. power mains 287. Accordingly, the failure lamp is extinguished to indicate equipment malfunction.

When the timer disc 244 has rotated around to its 0° position, the timer switch 256 will open thereby again momentarily breaking the normal energizing circuit for the failure relay 280. However, just before the timer switch 256 opens, the 0° timer switch 258 closes to complete the energizing circuit for the drum relay 192. Consequently, as described hereinabove, this relay pulls in and energizes the drum latch solenoid 102. If there is no failure in the drum latch mechanism, drum latch contacts 288 will close to provide an alternate energizing path for the failure relay 280 which thereupon remains energized. Any failure in the drum latch mechanism will prevent the contacts 288 from closing, and the failure relay thereupon will drop out thus extinguishing the failure lamp 286.

If there has been a failure in the equipment and the failure relay has been de-energized, its contacts 282 open to break the energizing circuit for this relay. After the equipment failure has been corrected, the relay may be re-energized by depressing a reset button 294 which connects the lower end of the relay winding to the negative power lead 210. The failure relay winding also is provided with a parallel capacitor 296 which provides a slight delay in the deactuation of the failure relay so that the failure lamp will not be extinguished by momentary fluctuations in current through the relay winding.

When the timer motor 242 opens the switch 259 (i.e. about 4.5 seconds before reaching the 350° position), the energizing circuit for the drum latch solenoid 102 is interrupted. Consequently, it is impossible to initiate rotation of the drum 30 during this period, which assures that the drum will not be reading out an anouncement when the tape is advanced, i.e. at the 350° position of the timer motor. If the drum already is rotating at the time switch 259 opens, the resulting electrical de-energization of the solenoid will not stop the read-out of the announcement because the roller 124 is then riding on the drive wheel 94. Moreover, this announcement will be fully completed before the tape is advanced at the 350° position.

To advance the tape manually, as by means of hand cranks (not shown) mounted on the reels 22 and 24, the manual-automatic switch 202 is rotated to its manual position so that its contacts 290 complete an energizing circuit for the sprocket latch solenoid 132. Accordingly, the roller 140 is moved out of the dwell in the sprocket wheel 144 thereby permitting the tape 26 to be drawn about the drum 30 by manual rotation of the reels. Contacts 200 of the manual-automatic switch also open to break the power connection to the lead 198 and assure that the drum relay 192 cannot be operated during manual shifting of the tape. In addition, manual-automatic switch contacts 292 open so that, when the timer cam disc 244 reaches its 350° position, the timer motor is de-energized by the opening of timer switch contacts 254.

The solenoid 102 also advantageously is provided with muting switch contacts (not shown) which normally short circuit the output circuit of the amplifier 226, and which open to remove this short circuit whenever the solenoid is energized. The muting contacts prevent the transmission of noise signals, etc., to the central recording machine during the times when the drum 30 is not scanning the tape 26.

The two advance solenoids 170 and 171 are connected to glow lamps 306 and 308 which are arranged to indicate the direction of advancing movement of the magnetic tape 26. These lamps are selectively energized in accordance with the positioning of the limit relay movable arm 264, this movable arm serving to short out one or the other of the glow lamps as it engages one or the other of the transfer contacts 266 or 272. In the switch position shown in the drawing, the glow lamp 308 is shorted out, while the lamp 306 is energized through a circuit which can be traced from the power lead 198 through the lamp, through a relatively large resistor 310, through the first advance solenoid winding, and through another relatively large resistor 312 back to the negative power lead 210. When the limit relay has been shifted to its other position, the glow lamp 308 is energized through resistors 314 and 316. The resistors 312 and 316 are sufficiently large that they do not effectively by-pass the corresponding sprocket latch solenoid contacts 148b and 148c, but allow sufficient current to pass through the glow lamps 306 and 308 to provide adequate illumination from these lamps.

We claim:

1. Apparatus adapted for use with a remote dictation system to produce predetermined audio-frequency information signals for recording by said system along with the material dictated from a remote station, and wherein said information signals are automatically altered periodically in accordance with a preset timed program, said apparatus comprising, in combination, a flexible record strip adapted to carry a track of sound signal impressions, said record strip having a portion thereof curved in the form of a loop, means mounting said record strip for movement in a lengthwise direction so as to rotate said loop portion, a reproducing head mounted for rotational mvement around and in contact with said loop portion to produce electrical output signals responsive to the sound signal impressions thereon, motor means, drive means coupled to said motor means and arranged when activated to rotate said reproducing head about said loop portion for single or repetitive read-out of the information signals thereon, reproduce control means for activating said drive means to cause said reproducing head to develop electrical output signals by physically scanning the sound signal impressions on said loop portion at least once each time said reproduce control means is operated, and sound signal programming means operable when said drive means is deactivated, said sound signal programming means including record-shifting means driven by said motor means and engaged with said record strip to move said record strip to place fresh sound signal impressions around said loop portion for subsequent single or repetitive scanning by said reproducing head.

2. Apparatus adapted for use with a remote dictation system to produce predetermined audio-frequency information signals for recording by said system along with the material dictated from a remote station, and wherein said information signals are automatically altered periodically in accordance with a preset program, said apparatus comprising, in combination, a support frame member, a pair of reels rotatably mounted on said support frame member, a flexible record strip adapted to carry a track of sound signal impressions and wound on said reels for movement therebetween, said record strip having a portion thereof intermediate said reels curved and maintained firmly in the form of a generally semi-circular loop, a reproducing head mounted for rotational movement around and in contact with said loop portion to produce electrical output signals responsive to the sound signal impressions thereon, motor means, drive means coupled to said motor means and arranged when activated to rotate said reproducing head about said loop portion for single or repetitive read-out of the information signals thereon, reproduce control means for activating said drive means to cause said reproducing head to develop electrical output signals by physically scanning the sound signal impressions on said loop portion at least once each time said reproduce control means is operated, sound signal programming means operable when said drive means is deactivated, said sound signal programming means including means driven by said motor means to rotate one of said reels so as to advance said record strip to place fresh sound signal impressions around said loop portion for subsequent single or repetitive scanning by said reproducing head, and metering means for controlling the lineal distance said record is advanced when said programming means is operated.

3. Apparatus adapted for use with a remote dictation system to produce predetermined audio-frequency information signals for recording by said system along with the material dictated from a remote station, and wherein said information signals are automatically altered periodically in accordance with a preset program, said apparatus comprising, in combination, a support frame member, a pair of reels rotatably mounted on said support frame member, a flexible record strip adapted to carry a track of sound signal impressions and wound on said reels for movement therebetween, said record strip having a portion thereof intermediate said reels curved in the form of a generally semi-circular loop, a reproducing head mounted for rotational movement around and in contact with said loop portion to produce electrical output signals responsive to the sound signal impressions thereon, motor means, drive means coupled to said motor means and arranged when activated to rotate said reproducing head about said loop portion for single or repetitive read-out of the information signals thereon, reproduce control means for activating said drive means to cause said reproducing head to develop electrical output signals by physically scanning the sound signal impressions on said loop portion, means for maintaining said drive means activated to assure that said reproducing head scans said loop portion at least once each time said reproduce control means is operated, sound signal programming means operable when said drive means is deactivated, solenoid-operated clutch means driven by said motor means and arranged when energized by said programming means to rotate one of said reels so as to advance said record strip to place fresh sound signal impressions around said loop portion for subsequent single or repetitive scanning by said reproducing head, metering means for controlling the lineal distance said record strip is advanced, and declutching means for automatically disengaging said clutch means after said record strip has been advanced a predetermined distance.

4. Apparatus adapted for use with a remote dictation system to produce audio-frequency information signals for recording by said system along with the material dictated from a remote station, and wherein said information signals are automatically altered periodically in accordance with a preset program, said apparatus comprising, in combination, a support frame member, a pair of reels rotatably mounted on said support frame member, a flexible record strip carrying a track of pre-recorded sound signal impressions consisting of a sequential group of equal-length segments, said record strip being wound on said reels for movement therebetween and having a portion thereof intermediate said reels curved in the form of a generally semi-circular loop having a length equal to the length of one of said segments, a reproducing head mounted for rotational movement around and in contact with said loop portion to produce electrical output signals responsive to the sound signal impressions thereon, motor means, drive means coupled to said motor means and arranged when activated to rotate said reproducing head about said loop portion for single or repetitive read-out of the information signals thereon, reproduce control means for activating said drive means to cause said reproducing head to develop electrical output signals by physically scanning the sound signal impressions on said loop portion at least once each time said reproduce control means is operated, said reproduce control means including indexing means to stop said reproducing head at a predetermined point with respect to said loop portion, sound signal programming means operable when said drive means is deactivated, said sound signal programming means including means driven by said motor means to rotate one of said reels so as to advance said record strip a distance sufficient to place the next succeeding segment of sound signal impressions around said loop portion for subsequent single or repetitive scanning by said reproducing head, and metering means for controlling the lineal distance said record is advanced.

5. Apparatus for storing sound signals sequentially and for producing and transmitting electrical signals representative of single or repetitive reproduction of a selected portion of such sound signals; said apparatus comprising, in combination, a support frame member, first and second reels rotatably mounted side-by-side on said support frame member, a flexible record strip wound on said reels and adapted to carry a continuous track of sound signal impressions, a drum rotatably mounted on said support frame member intermediate said reels, said record strip being wrapped about said drum in the form of a loop, a reproducing head mounted on the periphery of said drum for scanning movement around and adjacent said loop portion to produce electrical output signals responsive to sound signal impressions thereon, motor means, drive means coupled to said motor means and arranged when activated to rotate said reproducing head around said loop portion for single or repetitive read-out of the sound signal impressions thereon, reproduce command means operable to activate said drive means and including means to rotate said reproducing head at least once around said loop portion each time said reproduce command means is actuated, means to hold said record strip loop portion fixed in position in relation to said support frame member during the times said reproducing head is rotated by said drive means, record strip advancing means arranged when activated to rotate one of said reels to move said record strip between said reels; and control means adapted to activate said record strip advancing means, while said drum is stopped, to place fresh sound signal impressions around said loop portion for subsequent scanning by said reproducing head.

6. Apparatus as claimed in claim 5, wherein said drive means includes latch means adapted normally to lock said drum in at least one predetermined position and to stop the drum at such position after said drum has revolved the required amount.

7. Apparatus as claimed in claim 6, wherein said drive means includes a drive wheel for said drum, said latch means comprising a roller adapted to engage a dwell in the periphery of said drive wheel.

8. Apparatus as claimed in claim 7, including a movably-mounted puck arranged to be shifted into and out of a drive position wherein said puck imparts rotary motion to said drive wheel, said puck being coupled to said latch means and movable into said drive position whenever said roller has been lifted out of said dwell.

9. Apparatus as claimed in claim 8, wherein said puck and said latch means are coupled together by resilient means arranged to apply continuous pressure to said puck when in said drive position.

10. Apparatus for storing sound signals sequentially and for producing and transmitting electrical signals representative of single or repetitive reproduction of a selected portion of such sound signals; said apparatus comprising, in combination, a support frame member, first and second reels rotatably mounted side-by-side on said support frame member, a record wound on said reels and adapted to carry a narrow continuous track of sound signal impressions, a drum rotatably mounted on said support frame member intermediate said reels, a metering wheel rotatably mounted adjacent said drum, said record being mounted for movement in a path which extends along one side of said metering wheel to around said drum in the form of a loop and back along the other side of said wheel, record engaging means carried by said metering wheel to prevent slippage of said record with respect to said drum, a reproducing head mounted on the periphery of said drum for scanning movement around and adjacent said loop portion to produce electrical output signals responsive to sound signal impressions thereon, motor means, drive means coupled to said motor means and arranged when activated to rotate said reproducing head around said loop portion, reproduce command means operable to activate said drive means, record advancing means coupled to said motor means and arranged when activated to rotate one of said reels to move said record between said reels, and control means operable while said drum is stopped and adapted to activate said record advancing means to place fresh sound signal impressions around said loop portion for subsequent scanning by said reproducing head.

11. Apparatus for storing sound signals sequentially and for producing and transmitting electrical signals representative of single or repetitive reproduction of a selected portion of such sound signals; said apparatus comprising, in combination, a record having a length that is substantially greater than its width and adapted to carry a continuous track of sound signal impressions, said record having at least a portion thereof that is curved and maintained firmly in the form of a loop of constant radius, means mounting said record loop portion for movement in a direction in line with said track of sound signal impressions and perpendicular to the said radius thereof, reproducing means arranged to provide single or repetitive read out of the sound signal impressions on said record loop portion and including a reproducing head operable to produce electrical output signals responsive to said sound signal impressions, said reproducing head being held in fixed relation with respect to the side edges of said record and aligned with said track of sound signal impressions, support means adapted to hold said reproducing head and to maintain said head adjacent said record loop portion to sense the sound signal impressions thereon when said reproducing means is activated and consequent relative movement is produced between said record loop portion and said head in a direction in line with said track of sound signal impressions and perpendicular to said radius of said record loop portion, reproduce control means for activating said reproducing means to cause said reproducing head to develop electrical output signals by scanning the sound signal impressions on said record loop portion at least once each time said reproduce control means is operated, circuit means for transmitting said electrical output signals to a sound transducer, sound signal replacement means operable when said reproducing means is deactivated, said sound signal replacement means including motor-operated drive means engaged with said record and arranged when operated to move said record to place fresh sound signal impressions around said record loop portion for subsequent single or repetitive read out by said reproducing means, and replacement control means for operating said sound signal replacement means.

12. Apparatus for storing sound signals sequentially and for producing and transmitting electrical signals representative of single or repetitive reproduction of a selected portion of such sound signals; said apparatus comprising, in combination, a support frame member, first and second reels rotatably mounted side-by-side on said support frame member, a flexible record in the form of a strip of tape wound on said reels and adapted to carry at least one narrow continuous track of sound signal impressions, clutch means coupled to at least one of said reels and arranged when activated to rotate said one reel to advance said record strip, a drum rotatably mounted on said support frame member intermediate said reels, said record strip being positioned about said drum in the form of a loop, a reproducing head mounted on the periphery of said drum for scanning movement around and adjacent said loop portion to produce electrical output signals responsive to sound signal impressions thereon, motor means, drive means coupled to said motor means and arranged when activated to rotate said reproducing head around said loop portion, reproduce command means operable to activate said drive means, locking means to hold said record strip loop portion firmly in fixed position relative to said support frame member while said reproducing head is rotating therearound; and control means adapted to activate said clutch means, while said drum is stopped, to place fresh sound signal impressions around said loop portion for subsequent scanning by said reproducing head.

13. Apparatus as claimed in claim 12, wherein said clutch means includes first and second clutches each selectively actuatable to drive said first or second reels respectively, so as to permit said record to be advanced in either direction past said drum.

14. Apparatus as claimed in claim 13, wherein said drum includes a pair of reproducing heads mounted to scan parallel sound tracks on said record, and means to activate said heads selectively in accordance with the direction in which said record is to be advanced past said drum by said first or second clutches respectively.

15. Apparatus as claimed in claim 14, including limit sensing means associated with said record and operable to reverse the direction of advancing movement of said record when one of said reels has been exhausted.

16. Apparatus as claimed in claim 15, wherein said limit sensing means comprises a movably-mounted roller positioned adjacent said record in proximity to said one reel, and adapted to be shifted by said record strip when said one reel is exhausted.

17. Apparatus as claimed in claim 13, wherein said motor means is continuously coupled to said first and second clutches, said clutches including means arranged when said clutches are de-activated to transmit a light torque to said first and second reels respectively so as to slightly tension the record wound thereon.

18. Apparatus as claimed in claim 13, including metering means for controlling the amount of said record that is moved past said drum when one of said clutches is activated, said metering means serving normally to lock said record firmly in position around said drum, said metering means further including means operable when said record has been unlocked to activate one of said clutches for a period of time sufficient to move the required amount of said record past said drum.

19. Apparatus for providing selective reproduction of sound signals stored on a record medium, comprising, in combination, a support frame member, first and second reels rotatably mounted side-by-side on said support frame member, a flexible record strip wound on said reels and adapted to carry a narrow continuous track of sound signal impressions, said record strip being formed with at least one row of sprocket holes parallel to the side edges thereof, a drum rotatably mounted on said support frame member intermediate said reels, a metering sprocket rotatably mounted adjacent said drum, said metering sprocket carrying projecting teeth around the periphery thereof and adapted to engage the sprocket holes in said record strip, said record strip being mounted for movement in a path which extends along one side of said metering sprocket to around said drum in the form of a loop and back along the other side of said metering sprocket, said record strip being engaged with said projecting teeth on said two metering sprocket sides to prevent slippage of said record with respect to said drum, a reproducing head mounted on the periphery of said drum for scanning movement around and adjacent said record loop portion to produce electrical output signals responsive to sound signal impressions thereon, motor means, drive means coupled to said motor means and arranged when activated to rotate said reproducing head around said record loop portion, reproduce command means operable to activate said drive means, record strip advancing means arranged when activated to rotate one of said reels to shift said record strip between said reels and around said drum, and control means adapted to activate said record strip advancing means to place fresh sound signal impressions around said record loop portion for subsequent scanning by said reproducing head.

20. Apparatus for providing selective reproduction of sound signals stored on a record medium, comprising, in combination, a support frame member, first and second reels rotatably mounted side-by-side on said support frame member, a flexible record strip wound on said reels and adapted to carry a narrow continuous track of sound signal impressions, a drum rotatably mounted on said support frame member intermediate said reels, a metering wheel rotatably mounted adjacent said drum, indexing means for said metering wheel for normally holding said wheel stationary, said record strip being mounted for movement in a path which extends along and in contact with one side of said wheel to around said drum in the form of a loop, record strip engaging means carried by said metering wheel to prevent slippage of said record with respect to said drum, a reproducing head mounted on the periphery of said drum for scanning movement around and adjacent said loop portion to produce electrical output signals responsive to sound signal impressions thereon, motor means, drive means coupled to said motor means and arranged when activated to rotate reproducing head around said loop portion, reproduce command means operable to activate said drive means, record strip advancing means arranged when activated to rotate one of said reels to move said record strip between said reels, and control means adapted to activate said record strip advancing means to place fresh sound signal impressions around said loop portion for subsequent scanning by said reproducing head, said control means also being operable to release said indexing means, said indexing means including latch means arranged to stop the rotation of said metering wheel after a predetermined amount as said record strip has been advanced.

21. Apparatus as claimed in claim 20, wherein said indexing means includes disc means rotatable with said metering wheel, said disc means being formed on the periphery thereof with at least one recess, a latch mechanism including roller means mounted adjacent said disc and movable into said recess to hold said disc and said metering wheel in a predetermined position, said control means being arranged when operated to momentarily lift said roller means out of said recess to permit said disc to rotate as said record is moved past said metering wheel, and means connected to said roller means normally urging said roller means towards the periphery of said disc, whereby said roller means drops back into said recess after said predetermined amount of record has been advanced past said metering wheel.

22. Apparatus as claimed in claim 21, wherein said control means includes switch means operable by said latch mechanism when said roller means is lifted out of said recess, and means connected to said switch means for activating said record strip advancing means whenever said roller means is out of said recess.

23. Apparatus as claimed in claim 22, wherein said record strip advancing means comprises first and second clutches coupled to said first and second reels respectively, said clutches being selectively operable by said control means in accordance with the direction in which said record strip is to be advanced past said drum.

24. Apparatus as claimed in claim 21, including timer means adapted to operate said control means so as to advance said record strip in accordance with a preset program, said timer means including lock-out means arranged to deactivate said drive means whenever said record strip is being advanced, whereby to prevent the rotation of said drum during the advancing movement of said record.

25. Apparatus for providing selective reproduction and remote playback of sound signals stored on a record medium, comprising, in combination, a support frame member, first and second reels rotatably mounted side-by-side on said support frame member, a flexible record strip wound on said reels and adapted to carry a narrow continuous track of sound signal impressions, clutch means coupled to at least one of said first and second reels for rotating said reel in accordance with the direction it is desired to shift said record strip, a drum rotatably mounted on said support frame member intermediate said reels, said record strip being positioned about said drum in the form of a loop, a reproducing head mounted on said drum for scanning movement around said loop portion to produce electrical output signals responsive to sound signal impressions thereon, motor means, drive means coupled to said motor means and arranged when activated to rotate said reproducing head around said loop portion, reproduce command means operable to activate said drive means, said drive means including indexing means coupled to said drum to normally hold said drum stationary in a predetermined position, and to cause said drum to stop at said predetermined position after being rotated by said drive means, means to hold said record strip loop portion firmly in fixed position relative to the axis of said drum while said reproducing head is rotating therearound, coupling means for connecting said clutch means to said motor means, and control means adapted to activate said clutch means while said drum is stopped to place fresh sound signal impressions around said loop portion for subsequent scanning by said reproducing head.

26. Apparatus as claimed in claim 25, wherein said indexing means comprises a drive wheel secured to said drum and having stop means on the periphery thereof, latch means adjacent said drive wheel and movable into a position engageable with said stop means so as to hold said drive wheel stationary, said drive means including a latch mechanism operable when said drive means is activated to move said latch means out of engagement with said stop means, whereby to permit said drive wheel to be rotated as said record is advanced past said drum.

27. Apparatus as claimed in claim 26, wherein said stop means includes a recess formed in the periphery of said drive wheel, said latch means comprising a movably-mounted roller adapted to mate with said recess, spring means connected to said latch mechanism for urging said roller towards the periphery of said drive wheel, and solenoid means connected to said latch mechanism for lifting said roller out of said recess when said drive means is activated.

28. Apparatus as claimed in claim 25, wherein said clutch means comprises first and second clutches each coupled to a respective one of said first and second reels for advancing said record in either direction past said drum, direction-controlling circuit means forming part of said control means and having first and second conditions, said control means being adapted to selectively activate either said first or said second clutch in accordance with the condition of said direction-controlling circuit means.

29. Apparatus as claimed in claim 28, wherein said drum is provided with a pair of reproduce heads mounted to scan corresponding parallel sound tracks on said record, said reproduce heads being selectively activated in accordance with the condition of said direction-controlling circuit means.

30. Apparatus as claimed in claim 25, including failure indicating means, circuit means connected to said failure indicating means, said circuit means being controlled by said drive means to produce a failure indication when said drive means operates improperly in response to actuation of said reproduce command means.

31. Apparatus as claimed in claim 30, wherein said circuit means is interconnected with said control means to provide an indication of failure if said control means fails to actuate said clutch means.

32. Apparatus for storing sound signals sequentially and for producing and transmitting electrical signals representative of single or repetitive reproduction of a selected portion of such sound signals; said apparatus comprising, in combination, a support frame member, first and second reels rotatably mounted side-by-side on said support frame member, a flexible record strip wound on said reels and adapted to carry a continuous track of sound signal impressions, a drum rotatably mounted on said support frame member intermediate said reels, said record strip being wrapped about said drum in the form of a loop, a reproducing head mounted on the periphery of said drum for scanning movement around and adjacent said loop portion to produce electrical output signals responsive to sound signal impressions thereon, motor means, drive means coupled to said motor means and arranged when activated to rotate said reproducing head around said loop portion, reproduce command means operable to activate said drive means, means to hold said record strip loop portion fixed in position in relation to said support frame member during the times said reproducing head is rotated by said drive means, indexing means operable by said reproduce command means and arranged to stop said drum at a predetermined position after said reproduce command means has been deactivated, record strip advancing means arranged when activated to rotate one of said reels to move said record strip between said reels; and control means adapted to activate said record strip advancing means, while said drum is stopped, to place fresh sound signal impressions around said loop portion for subsequent scanning by said reproducing head.

33. Apparatus for storing sound signals sequentially and for producing and transmitting electrical signals representative of single or repetitive reproduction of a selected portion of such sound signals; said apparatus comprising, in combination, a support frame member, first and second reels rotatably mounted side-by-side on said support frame member, a flexible record strip wound on said reels and adapted to carry a continuous track of sound signal impressions, a drum rotatably mounted on said support frame member intermediate said reels, said record strip being wrapped about said drum in the form of a loop, a reproducing head mounted on the periphery of said drum for scanning movement around and adjacent said loop portion to produce electrical output signals responsive to sound signal impressions thereon, motor means, drive means coupled to said motor means and arranged when activated to rotate said reproducing head around said loop portion, reproduce command means operable to activate said drive means, means to hold said record strip loop portion fixed in position in relation to said support frame member during the times said reproducing head is rotated by said drive means, record strip advancing means arranged when activated to rotate one of said reels to move said record strip between said reels, interlock means operative with said reproduce command means to prevent rotation of said drum while said record strip is being advanced; and control means adapted to activate said record strip advancing means, while said drum is stopped, to place fresh sound signal impressions around said loop portion for subsequent scanning by said reproducing head.

34. Apparatus for providing selective reproduction of sound signals stored sequentially on a record, comprising, in combination, movably-mounted record supporting means carrying a flexible record having pre-recorded information signals thereon, a rotatable drum mounted adjacent said supporting means with at least a portion of its periphery engaged with said record, a reproduce head secured to said drum to produce an output signal in accordance with said information signals when said head is traversed in a relative scanning movement with respect to said record, drum driving means arranged when actuated to rotate said drum and scan said reproducing head along the section of information signals in contact with said drum, drum control means for actuating said drum driving means, record driving means operable when actuated to move said record supporting means and advance said record about said drum to shift a fresh section of information signals into position for scanning by said reproduce head, timer means for periodically operating said record driving means, interlock switch means adapted to disable said drum control means for a predetermined period of time prior to each operation of said record driving means, said timer means including means arranged to actuate said switch means to disable said drum control means said predetermined time period prior to the operation of said record driving means, said time period being slightly in excess of the time required to scan one section of information signals on said record.

35. Apparatus for providing selective reproduction of sound signals stored sequentially on a record, comprising, in combination, movably-mounted record supporting means carrying a flexible record having pre-recorded information signals thereon, a rotatable drum mounted adjacent said supporting means with at least a portion of its periphery engaged with said record, a reproduce head secured to said drum to produce an output signal in accordance with said information signals when said head is traversed in a relative scanning movement with respect to said record, drum driving means arranged when actuated to rotate said drum and scan said reproducing head along the section of information signals in contact with said drum, drum control means for actuating said drum driving means, record driving means operable when actuated to move said record supporting means and advance said record about said drum to shift a fresh section of information signals into position for scanning by said reproduce head, interlock switch means adapted to disable said drum control means for a predetermined period of time prior to each operation of said record driving means, and latch means for said drum driving means, said latch means being operable by said drum control means and arranged to assure that said drum rotates an amount sufficient to scan a complete section of said information signals.

36. Apparatus for producing time announcements comprising, in combination, record-supporting means, a flexible record mounted on said supporting means and adapted to carry sequential blocks of time signals, a rotatable drum, a reproduce head on said drum to engage said record and read out one of said blocks of time signals when the drum is rotated, reproduce command means including drum driving means operable to rotate said drum to read out said time signals, record driving means for advancing said record around said drum, a timing device automatically operable to periodically actuate said record driving means and move said record to shift a fresh block of time signals into position to be read out by said reproduce head, and interlock means under the control of said timing device and interconnected with said drum driving means to prevent rotation of said drum during the periodic intervals when said record is being advanced past said drum by said record driving means.

37. Apparatus as claimed in claim 36, wherein said interlock means includes switch means directly controlled by said timing device and operable to disable said drum driving means for a predetermined time period prior to each operation of said record driving means, said time period being at least as long as the duration of said blocks of time signals.

38. Apparatus as claimed in claim 36, wherein said interlock means includes a switch actuated by said record driving means while said record driving means is energized to shift said record about said drum, said switch being connected with said drum driving means and operable when actuated to disable said drum driving means until said record has been completely shifted into its new position.

39. Apparatus for providing selective reproduction and remote playback of sound signals stored on a record medium, comprising, in combination, a support frame member, first and second reels rotatably mounted side-by-side on said support frame member, a flexible record strip wound on said reels and adapted to carry two parallel continuous tracks of sound signal impressions, first and second rotating means coupled to said first and second reels respectively for rotating either of said reels in accordance with the direction it is desired to shift said record strip, a drum rotatably mounted on said support frame member intermediate said reels, said record strip being positioned about said drum in the form of a loop, a pair of reproduce heads mounted on said drum to scan said parallel sound tracks respectively, motor means, drive means coupled to said motor means and arranged when activated to rotate said reproducing heads around said loop portion, reproduce command means operable to activate said drive means, means to normally hold said drum stationary in a predetermined position and to cause said drum to stop at said predetermined position after being rotated by said drive means, control means adapted to activate said rotating means while said drum is stopped to place fresh sound signal impressions around said loop portion for subsequent scanning by said reproducing heads, direction-controlling means forming part of said control means and having first and second conditions, said control means being adapted to selectively activate either said first or second rotating means in accordance with the condition of said direction-controlling means, and means to selectively activate one of said reproduce heads in accordance with the condition of said direction-controlling means.

References Cited in the file of this patent

UNITED STATES PATENTS

| | | |
|---|---|---|
| 2,611,828 | Gunby | Sept. 23, 1952 |
| 2,648,589 | Hickman | Aug. 11, 1953 |
| 2,755,422 | Livingston | July 17, 1956 |
| 2,832,848 | Morin | Apr. 29, 1958 |